(12) United States Patent
Miller, Jr.

(10) Patent No.: US 9,346,440 B2
(45) Date of Patent: *May 24, 2016

(54) SYSTEM AND METHOD FOR CONTROLLING BRAKING PRESSURES AT WHEELS ON A VEHICLE

(71) Applicant: Bendix Commercial Vehicle Systems LLC, Elyria, OH (US)

(72) Inventor: Thomas Stephen Miller, Jr., Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,549

(22) Filed: Aug. 14, 2014

(65) Prior Publication Data

US 2016/0046268 A1    Feb. 18, 2016

(51) Int. Cl.
*B60T 8/18* (2006.01)
*B60T 15/02* (2006.01)
*B60T 8/1763* (2006.01)

(52) U.S. Cl.
CPC .............. *B60T 8/17636* (2013.01); *B60T 8/18* (2013.01); *B60T 15/027* (2013.01)

(58) Field of Classification Search
CPC ....... B60T 11/101; B60T 11/28; B60T 8/361; B60T 8/1764; B60T 8/58; B60T 15/028; B60T 8/17636; B60T 15/027; B60T 8/18
See application file for complete search history.

(56) References Cited

U.S. PATENT DOCUMENTS

| | | | | |
|---|---|---|---|---|
| 4,755,945 A | * | 7/1988 | Kade | B60T 8/1764 |
| | | | | 180/197 |
| 4,763,260 A | * | 8/1988 | Sakuma et al. | 701/80 |
| 4,807,944 A | * | 2/1989 | Weise | 303/113.3 |
| 4,881,784 A | | 11/1989 | Leppek | |
| 5,281,009 A | | 1/1994 | Kidston et al. | |
| 5,375,919 A | | 12/1994 | Furuhashi | |
| 5,538,334 A | | 7/1996 | Kushi et al. | |
| 5,697,682 A | * | 12/1997 | Watanabe | B60T 8/17636 |
| | | | | 303/169 |
| 5,921,640 A | | 7/1999 | Mortimer et al. | |
| 6,312,065 B1 | * | 11/2001 | Freitag | B60G 17/0195 |
| | | | | 303/186 |

(Continued)

FOREIGN PATENT DOCUMENTS

| | | |
|---|---|---|
| DE | 4326040 A1 | 2/1994 |
| DE | 19504295 A1 | 8/1995 |

(Continued)

OTHER PUBLICATIONS

Bendix EC-60 ABS/ATC Controllers (Standard & Premium), Service Data Sheet SD-13-4863, BW2428, 2011.

(Continued)

*Primary Examiner* — Rodney Butler
(74) *Attorney, Agent, or Firm* — Brian E. Kondas; Cheryl L. Greenly; Eugene E. Clair

(57) ABSTRACT

A controller controls respective braking pressures at wheels on a vehicle. The controller includes a processor electrically communicating with each of a plurality of switching valves, which controls braking pressures at respective wheels. The processor, during a braking event having a brake demand above a braking demand threshold, controls each of the switching valves to maintain braking pressures at the respective wheels based on at least one additional criteria.

20 Claims, 7 Drawing Sheets

(56) References Cited

U.S. PATENT DOCUMENTS

| | | | |
|---|---|---|---|
| 6,349,789 B1* | 2/2002 | Nakano et al. | 180/446 |
| 6,704,635 B2 | 3/2004 | Walenty et al. | |
| 8,276,993 B2* | 10/2012 | Ripley et al. | 303/5 |
| 2001/0038243 A1* | 11/2001 | Isono | 303/116.1 |
| 2004/0192534 A1* | 9/2004 | Nixon et al. | 501/95.2 |
| 2004/0227396 A1* | 11/2004 | Kusano | 303/113.1 |
| 2005/0107940 A1* | 5/2005 | Higuchi | 701/72 |
| 2005/0264104 A1* | 12/2005 | Inoue et al. | 303/190 |
| 2007/0120418 A1* | 5/2007 | Kajita et al. | 303/114.1 |
| 2008/0288148 A1 | 11/2008 | Amato | |
| 2010/0090058 A1* | 4/2010 | Cahill et al. | 244/111 |
| 2013/0226429 A1 | 8/2013 | Udaka et al. | |
| 2014/0180552 A1* | 6/2014 | Giddens et al. | 701/70 |
| 2014/0188363 A1 | 7/2014 | Eckert et al. | |

FOREIGN PATENT DOCUMENTS

| | | |
|---|---|---|
| DE | 112011103701 T5 | 8/2013 |
| GB | 2196076 A | 4/1988 |
| GB | 2499438 A | 8/2013 |
| JP | 11020652 A * | 1/1999 |

OTHER PUBLICATIONS

Notification of Transmittal of the International Search Report and the Written Opinion of the International Searching Authority, or the Declaration for PCT/US2014/050039 (1 page), mailed Feb. 23, 2015.

International Search Report received with the Notification of Transmittal of the International Search Report and the Written Opinion of the International Searching Authority, or the Declaration for PCT/US2014/050039 (6 pages), mailed Feb. 23, 2015.

Written Opinion of the International Searching Authority received with the Notification of Transmittal of the International Search Report and the Written Opinion of the International Searching Authority, or the Declaration for PCT/US2014/050039 (7 pages), mailed Feb. 23, 2015.

Notification of Transmittal of the International Search Report and the Written Opinion of the International Searching Authority, or the Declaration for counterpart International Appln. No. PCT/US2015/044566, mailed Oct. 21, 2015.

International Search Report for counterpart International Appln. No. PCT/US2015/044566, mailed Oct. 21, 2015.

Written Opinion of the International Searching Authority for counterpart International Appln. No. PCT/US2015/044566, mailed Oct. 21, 2015.

* cited by examiner

SYSTEM AND METHOD FOR CONTROLLING BRAKING PRESSURES AT WHEELS ON A VEHICLE

BACKGROUND

The present invention relates to a vehicle braking system. It finds particular application in conjunction with an anti-lock braking system and will be described with particular reference thereto. It will be appreciated, however, that the invention is also amenable to other applications.

Heavy vehicle braking systems commonly rely on compressed air for operating a vehicle braking system. Compressed air is produced by a compressor and stored in at least one reservoir. Various valves control fluid communication between the at least one reservoir and various brake circuits and individual brake chambers on respective wheels. Opening a valve from a reservoir to a brake circuit or a brake chamber increases the volume available for the compressed air stored in the reservoir. If an increased volume is available for the same amount of compressed air, the pressure of the compressed air in the increased volume drops.

In general, an anti-lock braking system (ABS) applies, holds, and releases pressure at an individual brake or multiple brakes to improve traction of the associated wheel and, furthermore, enhance vehicle control. Applying, holding, and releasing an individual brake is achieved by actuating and deactuating a valve associated with that brake. As discussed above, if the valve is in the apply state, the volume available for the compressed air increases, thereby decreasing the pressure in the reservoir. Decreased pressure in a brake circuit may impact the braking torque available to other brake chambers in the circuit.

The present invention provides a new and improved apparatus and method for addressing a decreased pressure available to brake chambers in a circuit when a valve to one of the brake chambers is in the apply state.

SUMMARY

In one embodiment, a controller controls respective braking pressures at wheels on a vehicle. The controller includes a processor electrically communicating with each of a plurality of switching valves, which controls braking pressures at respective wheels. The processor, during a braking event having a brake demand above a braking demand threshold, controls each of the switching valves to maintain braking pressures at the respective wheels based on at least one additional criteria.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
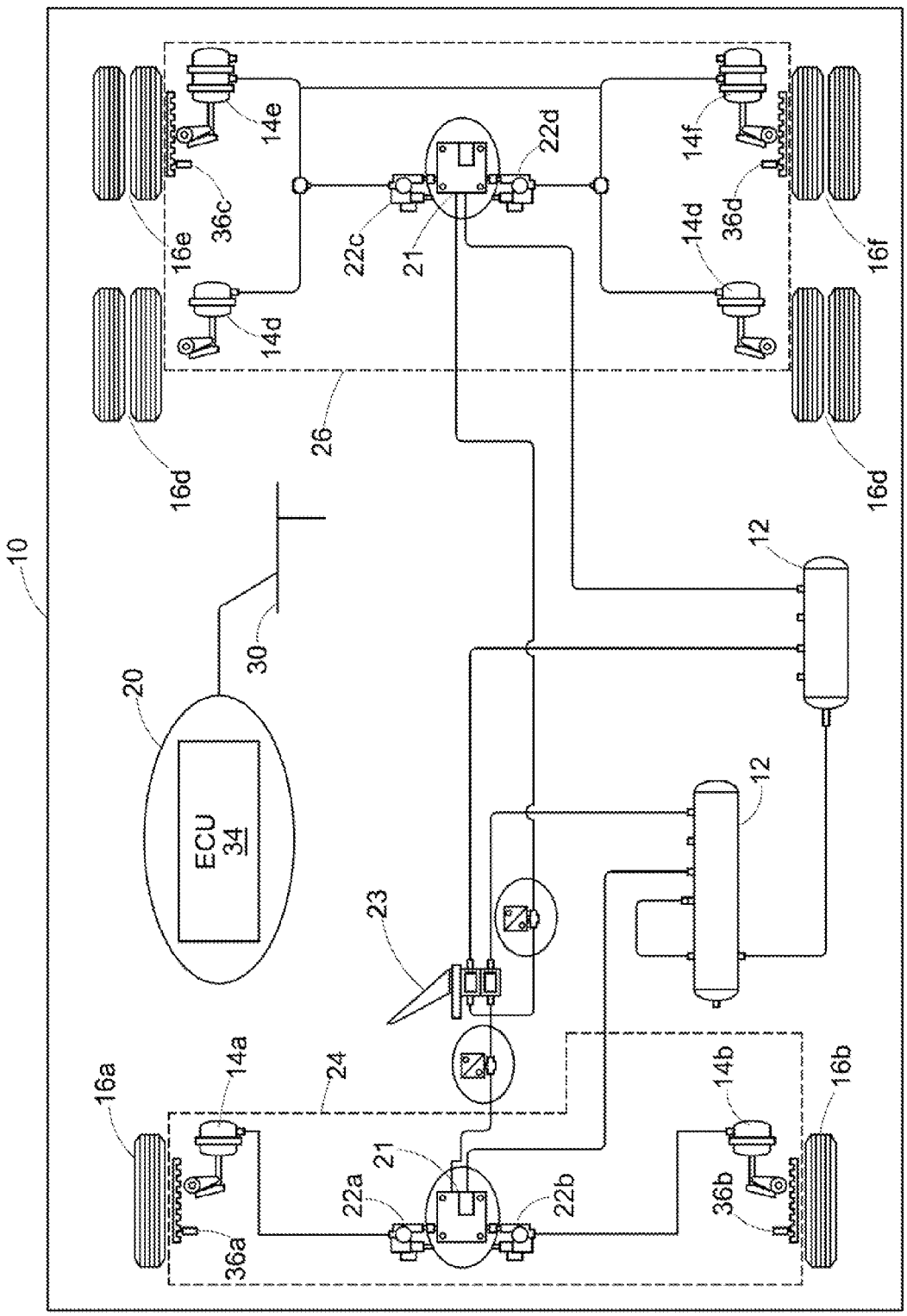
FIG. 1 illustrates a schematic representation of a vehicle including a braking system in accordance with one embodiment of an apparatus illustrating principles of the present invention.

With reference to FIG. 1, a simplified component diagram of a vehicle 10 including a compressed air braking system is illustrated in accordance with one embodiment of the present invention. The vehicle 10 includes reservoirs 12 that store compressed air for operating service brakes associated with respective brake chambers 14a, 14b, 14c, 14d, 14e, 14f (collectively, 14) on wheels 16a, 16b, 16c, 16d, 16e, 16f (collectively, 16) of the vehicle 10. A controller 20 controls delivery of the compressed air from the reservoirs 12 to the brake chambers 14 via switching valves 22a, 22b, 22c, 22d (collectively, 22) (e.g., solenoid valves) during an ABS event. The switching valves 22 are associated with the brake chambers 14 for applying and releasing the service brakes. In one embodiment, the switching valves 22 are normally open. In an ABS equipped system, the driver will first apply the service foot brake valve 23 which, in turn, opens relays valves 21 for transmitting compressed air to the switching valves 22. It will be appreciated by one skilled in the art that different methods of control of the compressed air to the brake chambers would be accomplished for a system equipped with a brake controller that can perform electronic stability program (ESP) or electronic braking system (EBS) control.

In the illustrated embodiment, the brake chambers 14a, 14b and respective switching valves 22a, 22b are in a first brake circuit 24. The brake chambers 14c, 14d, 14e, 14f and respective switching valves 22c, 22d are in a second brake circuit 26.

In one embodiment, the controller 20 electronically controls the compressed air delivered to the brake chambers 14a, 14b, 14c, 14d, 14e, 14f, for application of the service brakes during an ABS event, by electronically actuating the respective switching valves 22a, 22b, 22c, 22d. For example, the controller 20 transmits respective signals, via a vehicle communication bus 30, to set the respective switching valves 22 to one of i) an apply state, ii) a release state, and iii) a hold state. In the apply state, the switching valves 22 are normally open so that the brake chambers 14 fluidly communicate with the reservoirs 12. Therefore, in the apply state, the compressed air in the reservoirs 12 passes to the respective brake chambers 14 for applying the service brakes. In the release state, the switching valves 22 close so that the brake chambers 14 do not fluidly communicate with the reservoirs 12. Therefore, in the release state, the compressed air in the reservoirs 12 is prevented from reaching the respective brake chambers 14. At the same time, while in the release state, any compressed air currently in the respective brake chambers 14 is exhausted from the brake chambers 14 to atmosphere to release the service brakes. In the hold state, the switching valves 22 close so that the brake chambers 14 do not fluidly communicate with the reservoirs 12. Therefore, in the hold state, the compressed air in the reservoirs 12 is prevented from reaching the respective brake chambers 14. At the same time, while in the hold state, any compressed air currently in the respective brake chambers 14 is not exhausted from the brake chambers 14 and, instead, is held in the respective brake chambers 14 for maintaining application of the service brakes.

Although the illustrated embodiment shows the controller 20 transmitting signals to the switching valves 22 via the vehicle communication bus 30, other embodiments in which the controller 20 transmits signals directly to the switching valves 22 are also considered.

The controller 20 includes a communication port 32 and an electronic control unit (ECU) 34 (e.g., a processor). The communication port 32 electronically communicates with both the vehicle communication bus 30 and the ECU 34. In one embodiment, the ECU 34 is an anti-lock braking system (ABS) that controls the service brakes during an anti-lock braking event, by electronically actuating selected ones of the switching valves 22a, 22b, 22c, 22d of the respective brake chambers 14a, 14b, 14c, 14d, 14e, 14f to improve vehicle braking during certain conditions (e.g., when the wheels 16a, 16b, 16c, 16d, 16e, 16f slip during braking due to wet or icy road conditions).

Figure 2:
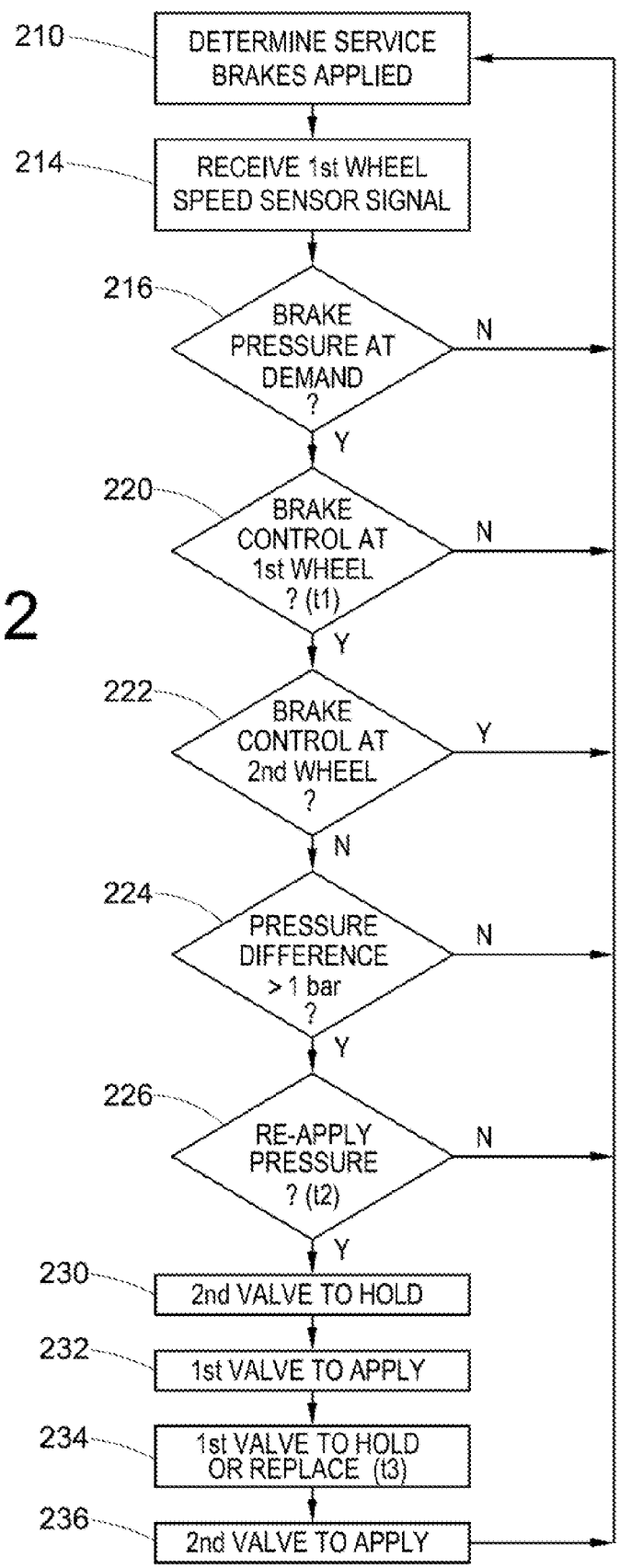
FIG. 2 is an exemplary methodology of controlling respective braking pressures at wheels on a vehicle in accordance with one embodiment illustrating principles of the present invention.

With reference to FIG. 2, an exemplary methodology of the system shown in FIG. 1 for controlling respective braking pressures is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

Figure 3:
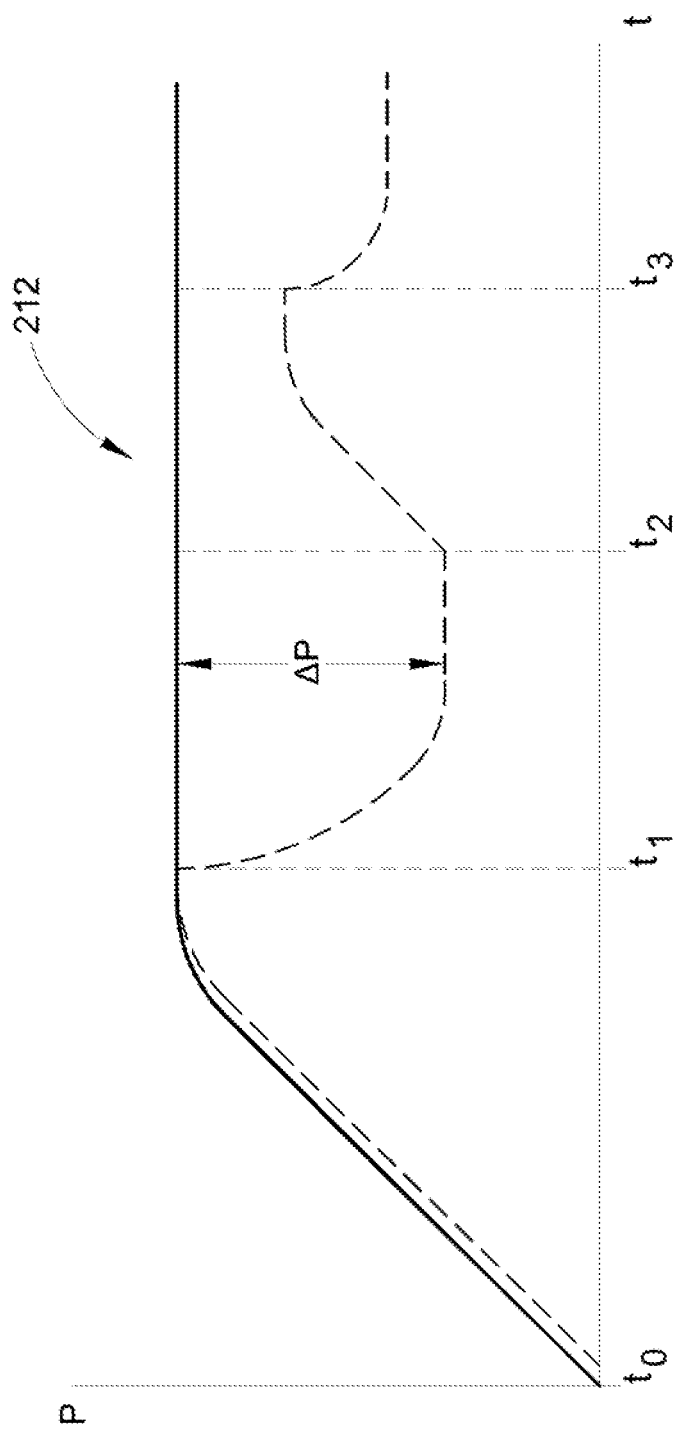
FIG. 3 illustrates a graphs of braking pressures versus time for two brake chambers in a circuit.

With reference to FIGS. 1 and 2, the controller 20 determines, in a step 210, that the vehicle service brakes are applied (see $t_0$ in FIG. 3). For example, the controller 20 determines that a vehicle operator has initiated a service brake application by depressing a pedal associated with the foot brake valve 23 and/or that the service brakes are automatically applied via, for example, ESP or EBS. At this stage, both the first and second valves 22a, 22b are in the apply state (e.g., normally open).

With reference to FIG. 3, graph 212 illustrates pressures in the first and second brake chambers 14a, 14b, respectively, versus time. In the graph 212, dashed lines represent the pressure in the first chamber 14a and solid lines represent the pressure in the second chamber 14b. The graph 212 shows that the pressures in the first and second brake chambers 14a, 14b, respectively, are substantially the same while both the first and second valves 22a, 22b are in the apply state (e.g., normally open), which is illustrated between time $t_0$ and time $t_1$. For illustration purposes, the dashed and solid lines in FIG. 3 are slightly offset from each other between the time $t_0$ and the time $t_1$.

With reference again to FIGS. 1 and 2, in a step 214, the controller 20 receives a first wheel speed sensor signal, from, for example, a first one of the wheel speed sensors 36a, which is associated with the wheel 16a. The first wheel speed sensor signal is transmitted to the ECU 34 (processor). In a step 216, the ECU 34 determines whether pressure in the service brake chambers 14a, 14b is at driver demand pressure. For example, the ECU 34 determines if the pressure in the service brake chambers 14a, 14b are at the expected pressure based on the pedal associated with the foot brake valve 23 being depressed by the vehicle operator and/or the service brakes being automatically applied via, for example, ESP or EBS. If it is determined in the step 216 that the pressure in the service brake chambers 14a, 14b are not at the expected pressure, control returns to the step 210.

Otherwise, if it is determined in the step 216 that the pressure in the service brake chambers 14a, 14b are at the expected pressure, control passes to a step 220 for determining if a brake control event is active at the first wheel 16a. If it is determined in the step 220 that a brake control event is not active at the first wheel 16a, control returns to the step 210. In one embodiment, if it is determined in the step 220 that a brake control event is active at the first wheel 16a, it is to be understood that the first valve 22a is in either the hold state or release state, and the second valve 22b is in the apply state (see $t_1$ in FIG. 3).

Then, in a step 222, the ECU 34 determines if a brake control event is active at the second wheel 16b. If it is determined in the step 222 that a brake control event is active at the second wheel 16b, control returns to the step 210. In one embodiment, if it is determined in the step 222 that a brake control event is not active at the second wheel 16b, it is to be understood that the first valve 22a is in either the hold state or release state, and the second valve 22b is in the apply state, which are the same states discussed above with reference to the step 220 when a brake control event is not active at the first wheel 16a.

With reference again to FIGS. 1 and 3, the graph 212 further illustrates pressures in the first and second brake chambers 14a, 14b, respectively, versus time. More specifically, the graph 212 shows that the pressure in the first brake chamber 14a becomes relatively lower than the pressure in the second brake chamber 14b after time $t_1$ when the first valve 22a transitions to the release state. The pressure in the second brake chamber 14b remains relatively higher than the pressure in the first brake chamber 14a after the time $t_1$, since the second valve 22b remains in the apply state.

With reference to FIGS. 1-3, if it is determined in the step 222 that a brake control event is not active at the second wheel 16b, control passes to a step 224 in which the ECU 34 determines if a pressure difference between two (2) brake chambers in a brake circuit is greater a predetermined pressure. In one embodiment, the predetermined pressure is about one (1) bar. For example, the ECU 34 determines if a pressure difference between the first and second brake chambers 14a, 14b in the brake circuit 24 is greater than the predetermined pressure. If it is determined in the step 224 that the pressure difference between the first and second brake chambers 14a, 14b in the brake circuit 24 is not greater than the predetermined pressure, control returns to the step 210.

If, on the other hand, it is determined in the step 224 that the pressure difference between the first and second brake chambers 14a, 14b in the brake circuit 24 is greater than the predetermined pressure (see $\Delta p$ in the graph 212), control passes to a step 226, in which the ECU 34 determines if pressure is to be re-applied to the first brake chamber 14a. The ECU 34 may determine that pressure is to be re-applied to the first brake 14a because, for example, of braking controlled by ABS, ESP, or EBS. If it is determined in the step 226 that pressure is not to be re-applied to the first brake chamber 14a, control returns to the step 210.

If, on the other hand, it is determined in the step 226 that pressure is to be re-applied to the first brake chamber 14a, the ECU 34 causes the second valve 22b to be transitioned to the hold state in a step 230 (at time $t_2$ in FIG. 3). Therefore, after step 230, the first valve 22a remains in either the hold state or the release state, and the second valve 22b is in the hold state. Then, in a step 232, the ECU 34 causes the first valve 22a to be transitioned from either the hold state or the release state to the apply state. Therefore, after step 232, the first valve 22a is in the apply state, and the second valve 22b is in the hold state. Optionally, the ECU 34 causes the first valve 22a to be transitioned to the apply state in the step 232 up to about 50 ms after the second valve 22b is transitioned to the hold state in the step 230.

With reference to FIGS. 1-3, the graph 212 further illustrates the first valve 22a is transitioned from the release state or the hold state to the apply state. Therefore, while the first valve 22a is in the release state or the hold state and the second valve 22b is in the apply state or hold state (e.g., between the time $t_1$ and the time $t_2$) the pressure in the first brake chamber 14a, which is represented by the dotted line, remains below the pressure in the second brake chamber 14b, Then, when the first valve 22a transitions to the apply state, (e.g., after the time $t_2$), the pressure in the first brake chamber 14a begins to rise (e.g., between the time $t_2$ and the time $t_3$ in FIG. 3).

After the step 232, control passes to a step 234 in which the ECU 34 sets the first valve 22a from the apply state to either the hold state or the release state (see the time $t_3$ in FIG. 3). Although it is contemplated that the first valve 22a may be set to either the hold state or the release state at the time $t_3$, the example illustrated in FIG. 3 shows the pressure in the first brake chamber 14a begins to drop after the time $t_3$. Therefore, FIG. 3 illustrates the embodiment in which the ECU 34 sets the first valve 22a from the apply state to the release state in the step 234.

Then, in a step 236, the ECU 34 sets the second valve 22b from the hold state to the apply state. Optionally, the ECU 34 causes the second valve 22b to be transitioned the apply state in the step 236 up to about 50 ms after the first valve 22a is transitioned to either the hold state or the release state in the step 234. In other words, the second valve 22b to be transitioned the apply state in the step 236 up to about 50 ms after the time $t_3$. Although the present embodiment is described as the ECU 34 setting the second valve 22b to the apply state up to about 50 ms after the time $t_3$, other embodiments in which the ECU 34 setting the second valve 22b to the apply state based on a pressure in the first brake chamber 14a (e.g., when the pressure in the first brake chamber 14a reaches about the same pressure as the second brake chamber 14b) are also contemplated.

Control then returns to the step 210.

As discussed in more detail below, in one embodiment, the step 232 occurs up to about 50 ms after the step 230. In addition, the step 236 occurs up to about 50 ms after the step 234.

The ECU 34 may act as a means for maintaining a higher braking pressure at the second brake while pressure increases at the first brake during a braking control event, if a braking pressure difference between the first and second brakes is greater than the predetermined threshold pressure. More specifically, the ECU 34 controls the first and second switching valves 22a, 22b as discussed herein to reduce pressure drops in the second brake chamber 14b when pressure is increased in the first brake chamber 14a due to a brake control event (e.g., ABS, ESP, or EBS).

Figure 4:
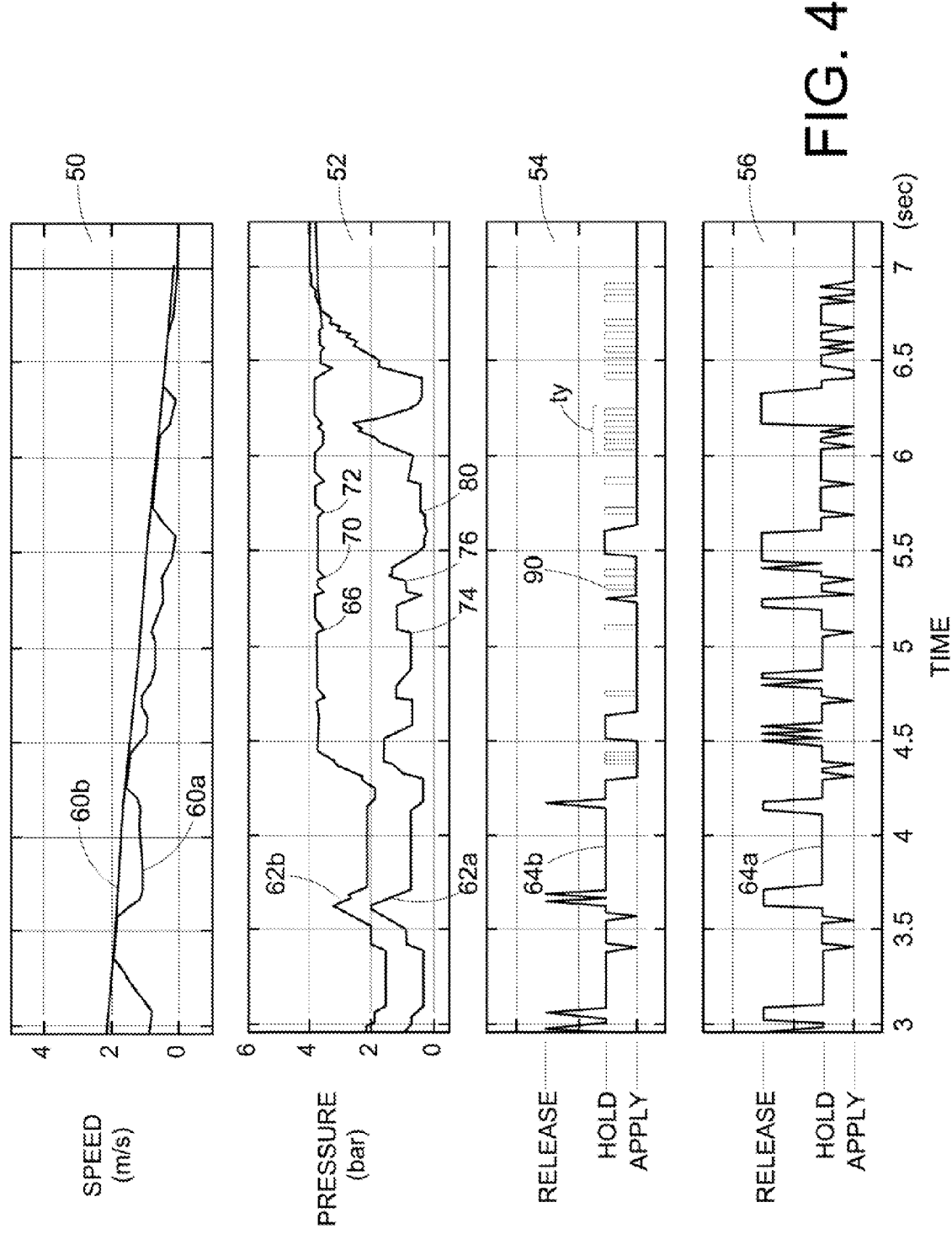
FIG. 4 illustrates various graphs for a system according to an embodiment of the present invention not including optional time between steps.

With reference to FIG. 4, three graphs 50, 52, and 56 representative of a system that does not employ the features of the embodiments described above for the present invention. The graph 50 illustrates speed versus time of the wheel 16a (see 60a) and the wheel 16b (see 60b). The graph 52 illustrates pressure versus time of the first brake chamber 14a (see 62a) and the second brake chamber 14b (see 62b). A graph 54 illustrates the states of the second valve 22b (see 64b). The graph 54 also illustrates a dotted line 90 representing how the states of the second switching device 22b are modified to include the hold states in the embodiments of the present invention. The graph 56 illustrates the states of the first valve 22a (see 64a). As illustrated in the graph 52, dips 66, 70, 72 in the line 62b, which represent dips in the pressure in the second brake chamber 14b, are evident at corresponding times when the line 62a rises 74, 76, 80, which represent pressure rises in the first brake chamber 14a.

Figure 5:
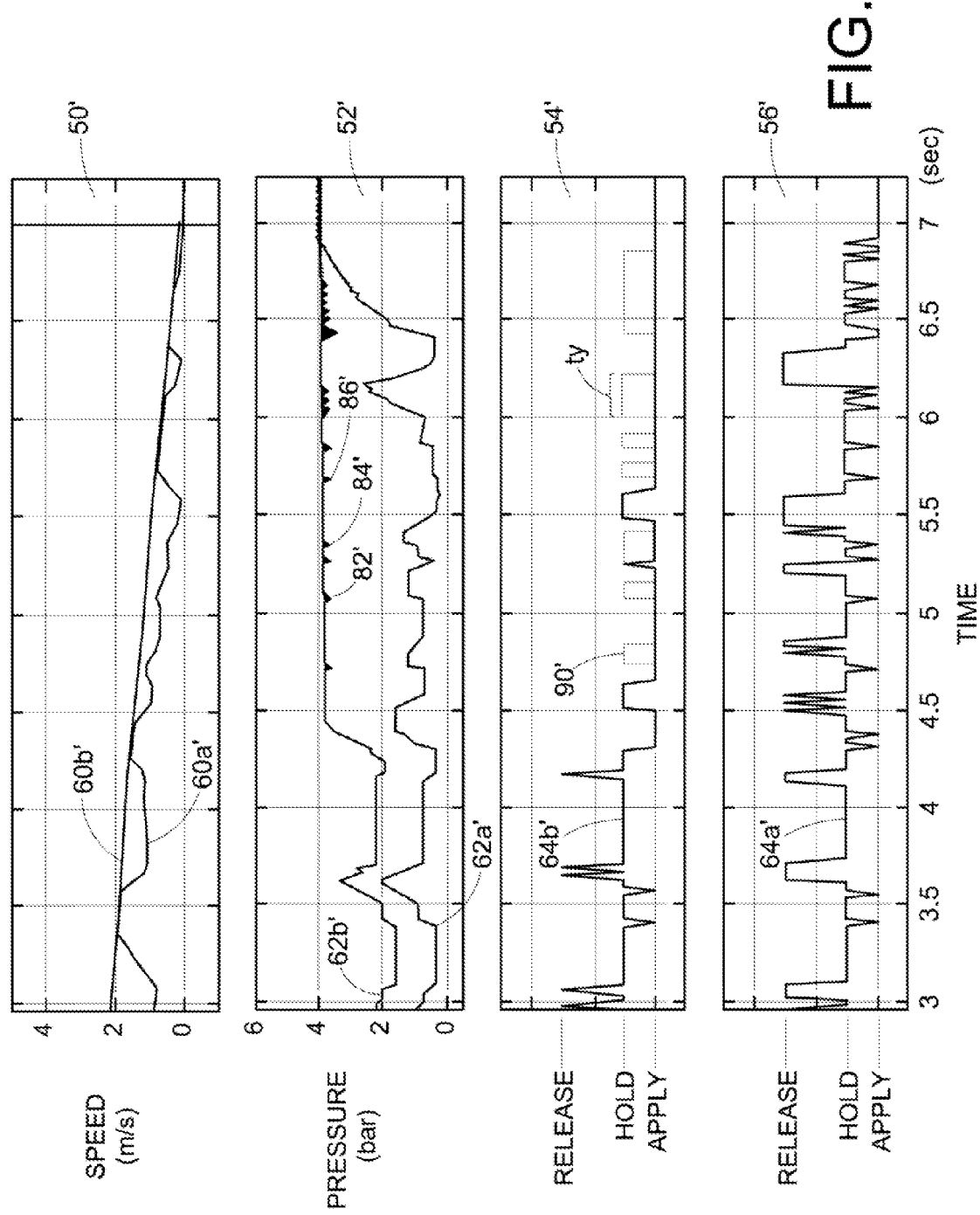
FIG. 5 illustrates various graphs for a system according to an embodiment of the present invention including optional time between steps.

FIG. 5 illustrates four graphs, which correspond to those illustrated in FIG. 4, representative of a system that does employ the features of the embodiments described above for the present invention. For ease of understanding FIG. 5, the corresponding graphs and other numerals in FIG. 4 are designated by like numerals with a primed (') suffix and new components are designated by new numerals.

With reference to FIGS. 4 and 5, the dips 66, 70, 72 illustrated in FIG. 4 are illustrated as filled portions 82', 84', 86' in FIG. 5. The filled portions 82', 84', 86' indicate the line 62b', which represents the pressure of the second brake chamber 14b, is relatively smoother than the line 62b (see FIG. 4), which represents torque gained in the second wheel 16b. The graph 54' (see FIG. 5) also illustrates a dotted line 90' representing how the states of the second switching device 22b are modified to include the hold states in the embodiments of the present invention.

Figure 6:
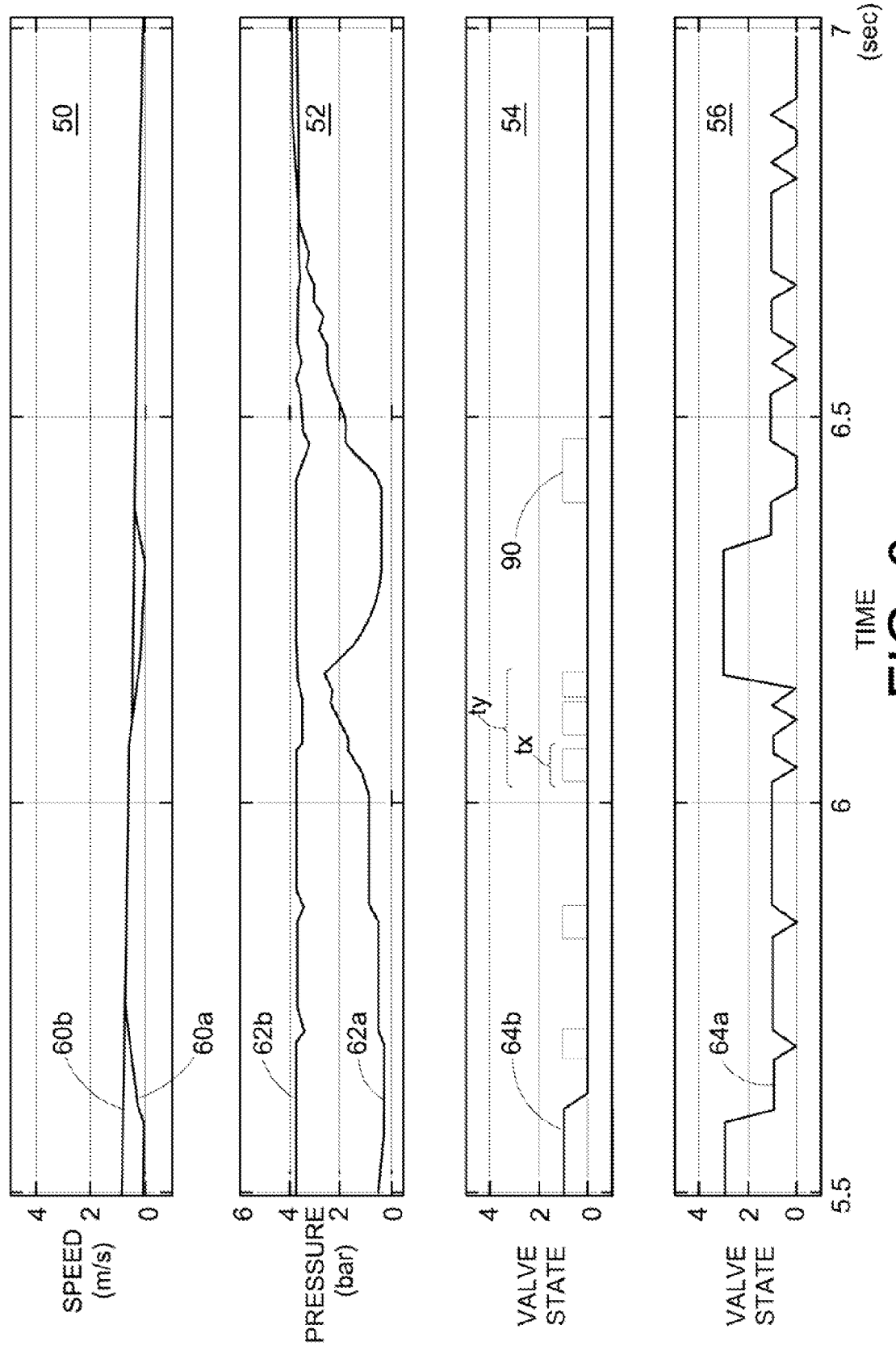
FIG. 6 illustrates enlarged portions of the various graphs shown in FIG. 4.

FIG. 6, illustrates an enlarged view of the graphs 50, 52, 54, 56 (see FIG. 4) between about 5.5 seconds and about 7.0 seconds). As noted above, the dotted line 90 in the graph 54 represents the states of the second valve 22b, and the graph 56 illustrates the states of the first valve 22a. As illustrated during the time period $t_x$, the second valve 22a is set to hold (see the step 230 in FIG. 2) and then the first valve 22a is substantially immediately set to the apply state (see the step 232 in FIG. 2). The first valve 22a is then set from the apply state to the hold state (see the step 234 in FIG. 2) and then the second valve 22b is substantially immediately set to the apply state (see the step 236 in FIG. 2). Therefore, the first valve 22a and the second valve 22b switch states substantially immediately after each other.

The optional times (e.g., 50 ms) between the steps 230 and 232 and between the steps 234 and 236 may act to reduce the number of times the second valve 22b switches between states. For example, in FIG. 5 the optional times are incorporated between the steps 230 and 232 and between the steps 234 and 236. While the second valve 22b switches to the hold state three (3) times during a time period $t_y$ in FIG. 4, which does not include the optional times between the steps 230 and 232 and between the steps 234 and 236, the second valve 22b switches to the hold state only one time during the time period $t_y$ in FIG. 5, Therefore, optional times between the steps 230 and 232 and between the steps 234 and 236 are expected to result in less wear on the second valve 22b and, in addition, capture more pressure at the second chamber 14b.

Figure 7:
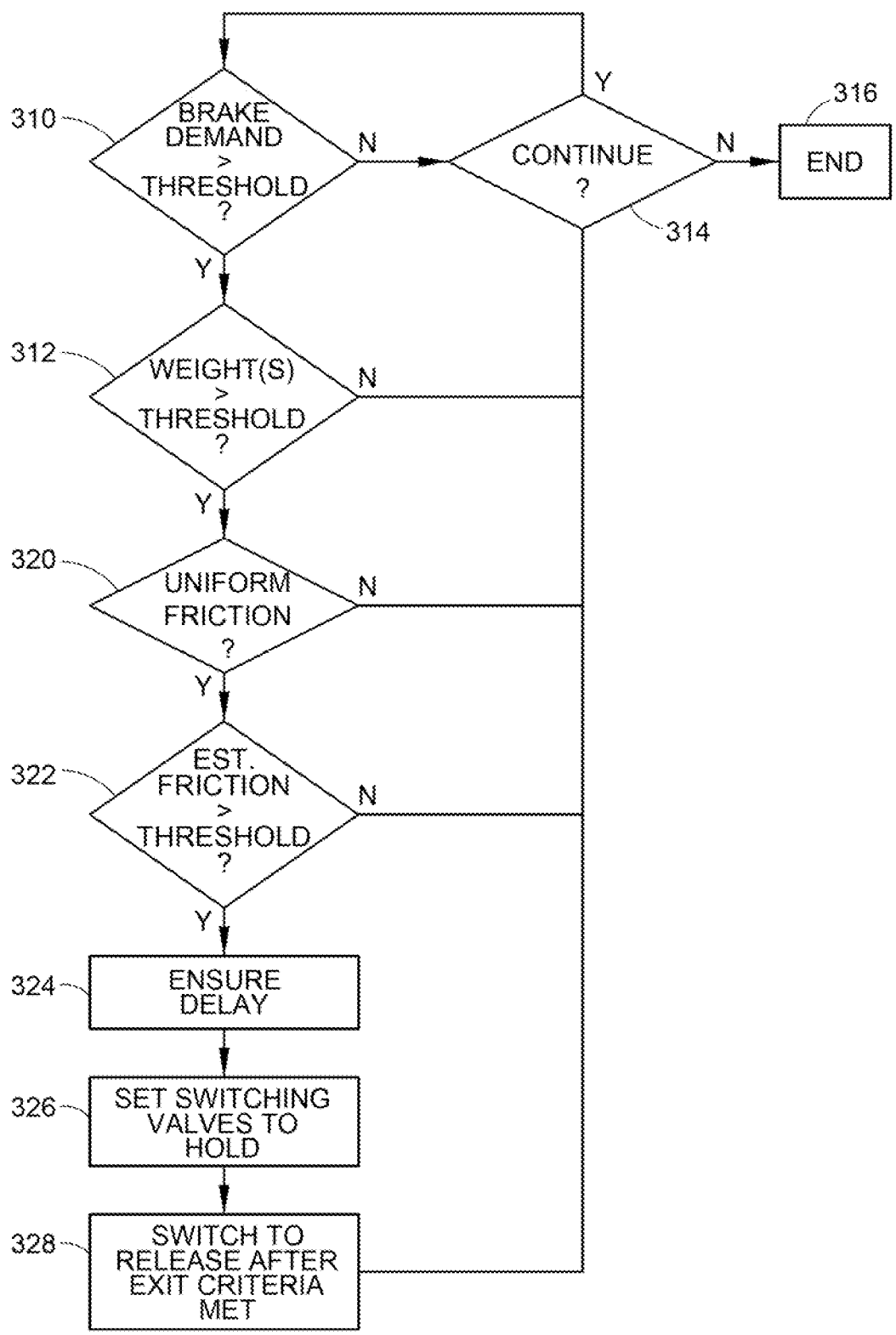
FIG. 7 is an exemplary methodology of controlling respective braking pressures at wheels on a vehicle in accordance with a second embodiment illustrating principles of the present invention.

With reference to FIG. 7, a second exemplary methodology of the system shown in FIG. 1 for controlling respective braking pressures is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 7, the controller 20 determines, in a step 310, whether braking demand is greater than a braking demand threshold. Braking demand may be determined based on how far the pedal associated with the foot brake valve 23 is depressed by the vehicle operator, the braking pressure desired by the operator as measured at the foot brake valve, or a deceleration request greater than a threshold as executed by an automated brake system algorithm (e.g., event) (such as from an active cruise with braking system (ACB)).

If the braking demand is greater than the predetermined braking demand threshold, control passes to a step 312. On the other hand, if the braking demand is not greater than the predetermined braking demand threshold, it is not desirable to implement the present braking method and, therefore, control passes to a step 314 for determining if the process should continue. If it is determined in the step 314 that the process should continue, control returns to the step 310 to, for example, start the process over. If, on the other hand, it is determined in the step 314 that the process should not continue, control passes to a step 316 for ending the process.

In the step 312, a determination is made whether respective weights on each of the wheels 16a, 16b, 16c, 16d, 16e, 16f (e.g., including a vehicle load) is greater than a predetermined weight threshold. If it is determined in the step 312 that the respective force (e.g. weight) on at least a predetermined number of the wheels 16a, 16b, 16c, 16d, 16e, 16f is/are not greater than the predetermined weight threshold, control passes to the step 314. In one embodiment, the predetermined number of the wheels 16a, 16b, 16c, 16d, 16e, 16f in the step 312 is all of the wheels 16a, 16b, 16c, 16d, 16e, 16f. However, other embodiments, in which the predetermined number of the wheels 16a, 16b, 16c, 16d, 16e, 16f in the step 312 is less than all of the wheels 16a, 16b, 16c, 16d, 16e, 16f are also contemplated. For example, the predetermined number of the wheels 16a, 16b, 16c, 16d, 16e, 16f in the step 312 may be selected to be at least one-half of the wheels 16a, 16b, 16c, 16d, 16e, 16f (e.g., three (3) of the six (6) wheels 16a, 16b, 16c, 16d, 16e, 16f). In another embodiment, the predetermined number of the wheels 16a, 16b, 16c, 16d, 16e, 16f in the step 312 may be selected to be at least one (1) (or any other number) of the wheels 16a, 16b, 16c, 16d, 16e, 16f on each side of the vehicle. For example, if the respective weights on at least one (1) (or any other number) of the wheels 16a, 16c, 16e, which are on a first side of the vehicle, is greater than the predetermined weight threshold and if the respective weights on at least one (1) (or any other number) of the wheels 16b, 16d, 16f, which are on a second side (e.g., the other side) of the vehicle, is greater than the predetermined weight threshold, the determination in the step 312 would be that the respective weights on at least a predetermined number of the wheels 16a, 16b, 16c, 16d, 16e, 16f is/are greater than the predetermined weight threshold. In another embodiment, the predetermined number of the wheels 16a, 16b, 16c, 16d, 16e, 16f in the step 312 may be selected to be the wheels on one (1) axle (or any other number of axles), such as 16a, 16b on the front axle of the vehicle.

If it is determined in the step 312 that the respective weights on at least a predetermined number of the wheels 16a, 16b, 16c, 16d, 16e, 16f is/are greater than the predetermined weight threshold, control passes to a step 320 for determining if the surface on which the vehicle 10 is traveling has a relatively uniform coefficient of friction (e.g., μ). For example, the ECU 34 may individually deactivate one or more of the service brakes associated with the respective brake chambers 14a, 14b, 14c, 14d, 14e, 14f to determine a spin velocity, if any, associated with the respective wheels 16a, 16b, 16c, 16d, 16e, 16f. In one embodiment, the ECU 34 sequentially deactivates one of the service brakes (e.g., 14a) on a first side of the vehicle 10 and then deactivates one of the service brakes (e.g., 14b) on a second side of the vehicle 10 (e.g., the other side of the vehicle 10 from the first side) and compares the respective spin velocities associated with the wheels 16a, 16b. If the spin velocities associated with the wheels 16a, 16b are within a predetermined spin velocity threshold of each other, it is determined in the step 320 that the surface has a relatively uniform coefficient of friction. Otherwise, if the spin velocities associated with the wheels 16a, 16b are not within the predetermined spin velocity threshold, it is determined in the step 320 that the surface does not have a relatively uniform coefficient of friction. It is to be understood that other methods are also contemplated for determining if the surface on which the vehicle 10 is traveling has a relatively uniform coefficient of friction.

If it is determined in the step 320 that the surface does not have a relatively uniform coefficient of friction or is not a uniformly smooth surface (such as a gravel road or a road with many bumps), control passes to the step 314. Otherwise, control passes to a step 322.

In the step 322, a determination is made whether an estimated coefficient of friction (e.g., estimated μ) for the surface on which the vehicle 10 is traveling is greater than a predetermined estimated coefficient of friction threshold. In one embodiment, the estimated coefficient of friction is determined based on the respective spin velocities, if any, of the associated wheels 16a, 16b, 16c, 16d, 16e, 16f when the brakes are deactuated in the step 320. For example, the estimated coefficient of friction is determined based on an average of the respective spin velocities, if any, of the associated wheels 16a, 16b, 16c, 16d, 16e, 16f when brakes are deactuated in the step 320. In another embodiment, the estimated coefficient of friction is determined by deactuating each of the service brakes associated with the respective brake chambers 14a, 14b, 14c, 14d, 14e, 14f to measure an amount of respective spin velocities, if any, of the associated wheels 16a, 16b, 16c, 16d, 16e, 16f. In this embodiment, the estimated coefficient of friction is based on an average of each of the respective spin velocities. If the estimated coefficient of friction for the surface on which the vehicle 10 is traveling is not greater than the predetermined estimated coefficient of friction threshold, control passes to the step 314.

Otherwise, if the estimated coefficient of friction for the surface on which the vehicle 10 is traveling is greater than the predetermined estimated coefficient of friction threshold, control passes to a step 324 for ensuring a delay is observed before passing to a step 326. In one embodiment, in the step 324, the ECU 34 ensures a time $t_4$ (e.g., about 1000 ms) passes after the onset of braking by the brake chambers 14a, 14b, 14c, 14d, 14e, 14f. In another embodiment, in the step 324, the ECU 34 ensures the time $t_4$ passes after the braking demand is determined (e.g., sensed) by the ECU 34 based on a position of the pedal associated with the foot brake valve 23 depressed by the vehicle operator, the pressure desired, or the deceleration request. Once the time $t_4$ delay passes, control passes to the step 326. In either case, the ECU 34 ensures the respective pressures in the brake chambers 14a, 14b, 14c, 14d, 14e, 14f are each above a predetermined brake pressure threshold.

In the step 326, at least one of the switching valves 22a, 22b, 22c, 22d are set to the hold state. Unlike the embodiment discussed above in FIG. 2, setting any one of the switching valves 22 to the hold state is not based on pressure differences in any of the brake chambers 14.

Referring again to FIGS. 1 and 7, after the step 326, the ECU 34, in a step 328, switches the switching valves 22 to the release state after an exit condition is met. In one embodiment, the exit condition is a time $t_5$ after at least one of the switching valves 22 are set to the hold state. It is contemplated that the time $t_5$ is based on a speed of the vehicle 10. In one embodiment, the time $t_5$ is about 5 seconds. For example, the ECU 34 switches the switching valves 22 to the release state the time $t_5$ after all of the switching valves 22 are set to the hold state. However, other exit conditions may cause the ECU 34 to switch one or more of the switching valves 22 to the release state prior to the time $t_5$ after at least one of the switching valves 22 are set to the hold state. Other exit conditions that may cause the ECU 34 to switch one or more of the switching valves 22 to the release state prior to the time $t_5$ may include the ECU 34 detecting a fault, detecting the speed of the vehicle drops below a predetermined exit speed, detecting that control braking event is activated (e.g., ABS, ESP or ACB), etc. More specifically, the ECU 34 may switch one or more of the switching valves 22 to the release state prior to the time $t_5$ if it is determined that the control system needs to reduce braking pressure in one or more of the brake chambers 14a, 14b, 14c, 14d, 14e, 14f to allow wheel slip at one or more of the respective wheels 16a, 16b, 16c, 16d, 16e, 16f to, for example, maintain vehicle stability.

Control then passes to the step 314.

In the description of FIGS. 1 and 7 above, it is to be understood that the ECU 34 acts as a means for controlling at least one of the switching valves to maintain braking pressures at the respective wheels based on at least one criteria. In addition, by ensuring the delay of the time $t_4$, the ECU 34 also acts as a means for ensuring the braking pressures are at the respective wheels 16 before controlling the at least one of the switching valves 22 to maintain the braking pressures. Also, the ECU 34 acts as a means for ensuring an exit criteria is met before releasing the braking pressures at the respective wheels 16.

It is to be understood that the method described with regard to FIG. 7 may typically be applied if at least one of the respective brake chambers 14a, 14b, 14c, 14d, 14e, 14f is in ABS control. However, in some situations such as if it is determined that the surface on which the vehicle 10 is traveling does not have a relatively uniform coefficient of friction (see the step 320 above), the method described with regard to FIG. 7 may not be applied.

Furthermore, it is to be understood that the method described with regard to FIGS. 1 and 7 may be applied for trucks not including a trailer (e.g., straight trucks or tractors without a trailer).

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller controlling respective braking pressures at wheels on a vehicle, the controller comprising:
a processor electrically communicating with each of a plurality of switching valves, which control braking pressures at respective wheels, the processor, during a braking event having a brake demand above a braking demand threshold, controlling each of the switching valves to maintain braking pressures at the respective wheels based on at least one additional criteria including a relatively uniform coefficient of friction of a surface on which the vehicle is traveling, and if the surface on which the vehicle is traveling has the relatively uniform coefficient of friction, the processor controlling the switching valves to maintain the braking pressures at the respective wheels only after a delay after an onset of the braking pressures at the respective wheels.

2. The controller as set forth in claim 1, wherein:
the at least one additional criteria further includes a weight on at least one of the wheels; and
the processor controls the switching valves to maintain the braking pressures at the respective wheels if the weight on the at least one of the wheels is above a predetermined weight threshold.

3. The controller as set forth in claim 2, wherein:
the processor determines the surface has the relatively uniform coefficient of friction based on respective wheel spin velocities of at least two of the wheels being within a predetermined spin velocity threshold.

4. The controller as set forth in claim 3, wherein:
the at least one additional criteria includes an estimated coefficient of friction for the surface on which the vehicle is traveling; and
the processor controls the switching valves to maintain the braking pressures at the respective wheels if the estimated coefficient of friction is greater than a predetermined estimated coefficient of friction threshold.

5. The controller as set forth in claim 1, wherein:
the processor controls the switching valves to ensure a predetermined brake pressure threshold is in each of respective brake chambers associated with the wheels before controlling the switching valves to maintain the braking pressures.

6. The controller as set forth in claim 5, wherein:
the processor controls the switching valves to release the braking pressures to atmosphere after an exit condition is met.

7. The controller as set forth in claim 6, wherein the exit condition includes at least one of:
a time $t_5$ after the switching valves are set to maintain the braking pressures, the time $t_5$ being based on a speed of the vehicle;
the speed of the vehicle is below a predetermined exit speed; and
an activation of a control braking event.

8. The controller as set forth in claim 1, wherein:
the processor sets each of the switching valves to a hold state to maintain the braking pressures.

9. A vehicle braking system, comprising:
a brake circuit including respective brakes associated with respective wheels;
respective switching valves associated with the brakes; and
a braking controller controlling respective braking pressures at the brakes, the controller comprising:
a processor electrically communicating with each of the switching valves, which controls braking pressures at respective wheels, the processor, during a braking event having a brake demand above a braking demand threshold, controlling each of the switching valves to maintain braking pressures at the respective wheels based on at least one additional criteria including a relatively uniform coefficient of friction of a surface on which the vehicle is traveling, and if the surface on which the vehicle is traveling has the relatively uniform coefficient of friction, the processor controlling the switching valves to maintain the braking pressures at the respective wheels only after a delay after an onset of the braking pressures at the respective wheels.

10. The vehicle braking system as set forth in claim 9, wherein:
the at least one additional criteria includes a weight on at least one of the wheels; and
the processor controls the switching valves to maintain the braking pressures at the respective wheels if the weight on the at least one of the wheels is above a predetermined weight threshold.

11. The vehicle braking system as set forth in claim 9, wherein:
the processor determines the surface has the relatively uniform coefficient of friction based on respective wheel spin velocities of at least two of the wheels being within a predetermined spin velocity threshold.

12. The vehicle braking system as set forth in claim 11, wherein:
the at least one additional criteria includes an estimated coefficient of friction for the surface on which the vehicle is traveling; and
the processor controls the switching valves to maintain the braking pressures at the respective wheels if the estimated coefficient of friction is greater than a predetermined estimated coefficient of friction threshold.

13. The vehicle braking system as set forth in claim 9, wherein:
the processor controls the switching valves to release the braking pressures after at least one of:
a time $t_5$ after the at least one of the switching valves is set to maintain the braking pressures;
a speed of the vehicle is below a predetermined exit speed; and
an activation of at least one of an antilock braking system event, an electronic stability program event, and an automated braking system event.

14. A method for controlling respective braking pressures at wheels in a common braking circuit on a vehicle, the method comprising:
determining if a braking demand is above a brake demand threshold;
determining if at least one additional criteria including a relatively uniform coefficient of friction of a surface on which the vehicle is traveling is met; and
if the braking demand is above the brake demand threshold and the at least one additional criteria is met, maintaining the braking pressures at the respective wheels only after a delay after an onset of the braking pressures at the respective wheels to reduce lowering of the braking pressures at the respective wheels when braking pressure is controlled at another wheel.

15. The method for controlling respective braking pressures at wheels on a vehicle as set forth in claim 14, wherein the maintaining step includes:
controlling respective switching valves associated with the wheels.

16. The method for controlling respective braking pressures at wheels on a vehicle as set forth in claim 15, wherein the maintaining step includes:
setting the respective switching valves a hold state.

17. The method for controlling respective braking pressures at wheels on a vehicle as set forth in claim 14, further including:
before the maintaining step, ensuring a predetermined brake pressure threshold is in respective brake chambers associated with the wheels.

18. The method for controlling respective braking pressures at wheels on a vehicle as set forth in claim 14, further including:
determining if the at least one additional criteria is met, including:
determining if respective weights on the at least one of the wheels is above a predetermined weight threshold;
determining if a surface on which the vehicle is traveling has a relatively uniform coefficient of friction and is a uniformly smooth surface; and
determining if an estimated coefficient of friction of the surface on which the vehicle is traveling is greater than a predetermined estimated coefficient of friction threshold.

19. The method for controlling respective braking pressures at wheels on a vehicle as set forth in claim 18, wherein determining if the surface on which the vehicle is traveling has the relatively uniform coefficient of friction includes:
deactuating the brakes at at least one of the wheels;
determining respective wheel spin velocities of the at least one wheel associated with the deactuated brakes; and
determining if the wheel spin velocities are within a predetermined spin velocity threshold of each other.

20. The method for controlling respective braking pressures at wheels on a vehicle as set forth in claim 14, further including:
releasing the braking pressures at the at least one respective wheel after at least one of:
a time $t_5$ after the step of maintaining; and
a speed of the vehicle is below a predetermined exit speed; and
an activation of at least one of an antilock braking system event, an electronic stability program event, and an automated braking system event.

* * * * *